(12) United States Patent
    Zhijian (10) Patent No.: US 10,574,071 B2
(45) Date of Patent: Feb. 25, 2020

(54) BAG OR LUGGAGE WITH USB CHARGING CONNECTOR

(71) Applicant: Li Zhijian, Fujian (CN)

(72) Inventor: Li Zhijian, Fujian (CN)

( * ) Notice: Subject to any disclaimer, the term of this patent is extended or adjusted under 35 U.S.C. 154(b) by 18 days.

(21) Appl. No.: 14/836,104

(22) Filed: Aug. 26, 2015

(65) Prior Publication Data

US 2016/0141904 A1 May 19, 2016

(30) Foreign Application Priority Data

Nov. 18, 2014 (CN) ...................... 2014 2 0692148 U (51) Int. Cl.
    *H02J 7/00* (2006.01)

(52) U.S. Cl.
    CPC .......... *H02J 7/0054* (2013.01); *H02J 7/0042* (2013.01); *H02J 2007/0062* (2013.01)

(58) Field of Classification Search
    CPC . H02J 7/0054; H02J 7/0042; H02J 2007/0062
    USPC ........................... 320/103, 107, 111; 224/902
    See application file for complete search history.

(56) References Cited

U.S. PATENT DOCUMENTS

| | | | | |
|---|---|---|---|---|
| 6,816,760 B1 * | 11/2004 | Namaky | ............. | G06F 11/2733 701/33.2 |
| 6,870,089 B1 * | 3/2005 | Gray | ..................... | H01L 31/042 136/200 |
| 7,914,306 B1 * | 3/2011 | Blackwell | .......... | H01R 13/5213 439/135 |
| 10,130,163 B2 * | 11/2018 | Zhijian | ...................... | A45F 4/02 |
| 2002/0198031 A1 | 12/2002 | Holmes | | |
| 2005/0140331 A1 * | 6/2005 | McQuade | .............. | A45C 15/00 320/101 |
| 2007/0297149 A1 * | 12/2007 | Richardson | ........... | G06F 1/1626 361/731 |
| 2008/0011799 A1 | 1/2008 | Chang | | |
| 2008/0125164 A1 | 5/2008 | Singh | | |
| 2008/0210728 A1 * | 9/2008 | Bihn | ........................ | A45F 3/04 224/576 |
| 2009/0061926 A1 | 3/2009 | Lee | | |
| 2009/0224722 A1 | 9/2009 | Causey | | |
| 2009/0276089 A1 * | 11/2009 | Bartholomew | ........ | G06Q 10/02 700/235 |
| 2011/0110514 A1 | 5/2011 | Gustavsson | | |
| 2012/0262117 A1 * | 10/2012 | Ferber | .................. | H02J 7/0047 320/111 |

(Continued)

FOREIGN PATENT DOCUMENTS

KR         2014132850 A    11/2014

*Primary Examiner* — Richard V Muralidar
(74) *Attorney, Agent, or Firm* — Jennifer Meredith, Esq.; Meredith Attorneys, PLLC (57) ABSTRACT

A backpack for convenient charging, the backpack comprising: a backpack body with a battery storage space to accommodate a storage battery unit; at least one strap connected to the backpack body, where at least one strap has a fixture for fixing a product to be charged and a power cable output port proximal to the fixture; wherein the backpack body further includes at least one cable passage leading from the battery storage space to the power cable output port to accommodate at least one power cable each with a first end and a second end, wherein at least one of the first end and the second end of the at least one power cable is connected to the storage battery unit to be charged.

17 Claims, 10 Drawing Sheets

(56) References Cited

U.S. PATENT DOCUMENTS

| | | |
|---|---|---|
| 2012/0299528 A1 | 11/2012 | Scarmozzino |
| 2013/0026726 A1 | 1/2013 | Thomas |
| 2013/0162389 A1 | 6/2013 | Crucs |
| 2013/0214931 A1 | 8/2013 | Chia |
| 2013/0249673 A1 | 9/2013 | Ferrari |
| 2014/0002239 A1 | 1/2014 | Rayner |
| 2014/0061273 A1* | 3/2014 | Bullivant ................ A45F 3/04 224/576 |
| 2014/0171132 A1 | 6/2014 | Ziemianska |
| 2014/0327401 A1 | 11/2014 | Pickens |
| 2015/0296644 A1 | 10/2015 | Chin |
| 2015/0318716 A1 | 11/2015 | Pickens |
| 2015/0326044 A1* | 11/2015 | Ashley ................ H02J 7/0054 320/103 |
| 2015/0359127 A1 | 12/2015 | Daoura |
| 2015/0366333 A1 | 12/2015 | Zhijian |
| 2016/0141904 A1 | 5/2016 | Zhijian |
| 2018/0152037 A1 | 5/2018 | Yu |
| 2018/0198295 A1 | 7/2018 | Warney |

\* cited by examiner

BAG OR LUGGAGE WITH USB CHARGING CONNECTOR

TECHNICAL FIELD

The present invention model relates to a bag or luggage, especially a bag or luggage for convenient charging of personal devices such as smart phones, tablets or any device that requires recharging.

BACKGROUND OF THE INVENTION

Bags and luggage have become a necessity in our everyday lives, such as backpacks (student backpacks and outdoor backpacks), travel boxes, briefcases, lady handbags, shoulder bags and so on. With the constant development of our society, diverse portable digital devices are emerging in our lives, and we rely more and more on them, including tablet computers, cellphones, digital cameras, video cameras and the like. In addition to containing the stuff, people want more functionality from the bags and luggage. For example, charging the portable digital devices. Especially for tourists, field staff and those making long-term business trips, it is not easy to charge their digital devices when the battery is dying, causing a lot of inconvenience and trouble in their works and lives. The present bags and luggage are equipped with no charging function, or a portable power source is provided in a bag or luggage for charging. It is necessary to open the bag or luggage for charging, which is quite inconvenient.

SUMMARY OF THE INVENTION

The present invention intends to overcome the disadvantages stated above, and provides a type of bag or luggage for convenient charging, which enables the user to charge a device or product needing to be charged conveniently at any time or any place during traveling, without necessarily opening the bag or luggage, nor taking out the power source for charging.

The present invention is realized in the following way: a type of bag or luggage for convenient charging, comprising the luggage body, wherein, a placing space for placing an electrical storage device is provided inside the bag or luggage body, and a power cable outlet on the outer surface of the bag or luggage body; the bag or luggage further comprises a USB extension cable on the body of the luggage, and the male connector of the USB extension cable is inside the bag or luggage body, which is used to connect to the electrical storage device in the electrical storage device placing space; the female connector is in the power cable outlet or exposed outside the power cable outlet, and the female connector may be equipped with a sheath for water proofing wrapped on the outer surface of the female connector.

During traveling, when the battery of the product to be charged is dying, it is only necessary to plug the charging interface of the product to be charged into the female connector of the USB extension cable, then the charging starts, without necessarily opening the bag or luggage, nor taking out the power source for charging.

The sheath may be further equipped with a dust cap for dust proofing.

The power cable outlet may be provided on the surface of the bag or luggage, the female connector is exposed outside the power cable outlet, and the dust cap is attached on the side of the female connector, which is overturning connected to the side of the female connector.

The power cable outlet may be provided in a groove on the side of the bag or luggage, and the dust cap may be at the opening of the groove, which is overturning connected to the groove.

The power cable outlet may be provided on any edge of the nameplate.

The power cable outlet may be provided on either side of the fastener.

For the convenience of the configuration of the USB extension cable, the bag or luggage body is provided with a cable laying channel from the power storage device placing space to the power cable outlet for the penetration of the USB extension cable.

In order to prevent the loss of the bag or luggage, the female connector of the USB extension cable is further equipped with a Bluetooth anti-lost alarm, which is used to connect to the Bluetooth device on the product to be charged.

For real-time positioning or location of the bag or luggage for convenient charging provided by the utility model, the female connector of the USB extension cable may be further equipped with a GPS device for positioning (or locating).

For the convenience of charging during traveling, the power cable outlet is on a shoulder strap of the bag.

Compared with the prior art, the utility model enjoys the following advantages: (1) The utility model provides a bag or luggage for convenient charging, which enables a user to charge a product needing to be charged conveniently at any time or any place during traveling, without necessarily opening the bag or luggage, nor taking out the power source for charging. In addition, the charging interface is featured with waterproof and dust-proof functions, resulting in reliable performance; (2) The bag or luggage for convenient charging provided by the utility model is equipped with a Bluetooth anti-lost alarm. When the user is at a certain distance away from the bag or luggage for convenient charging, the Bluetooth anti-lost alarm is going to send an alarm signal to remind the user, so that it is efficient to prevent the loss of the bag or luggage; (3) The bag or luggage for convenient charging provided by the utility model is further equipped with a GPS device for positioning, for real-time positioning the bag or luggage.

BRIEF DESCRIPTION OF THE DRAWINGS

The utility model is further described as follows with reference to drawings and embodiments.

Description of the symbols in the drawings: 1. bag or luggage body; 2. USB extension cable; 2-1. male connector; 2-2. female connector; 3. sheath; 4. duct cap; 5. groove; 6. nameplate; 7. fastener; 8. cable laying channel; 9. Bluetooth anti-lost alarm; 10. GPS device; 11. shoulder strap; 12. external USB connecting line; and power cable outlet 14.

DETAILED DESCRIPTION OF THE EMBODIMENTS

The content of the utility model is further described in detail as follows with reference to the drawings for specification and specific embodiments.

Figure 1:
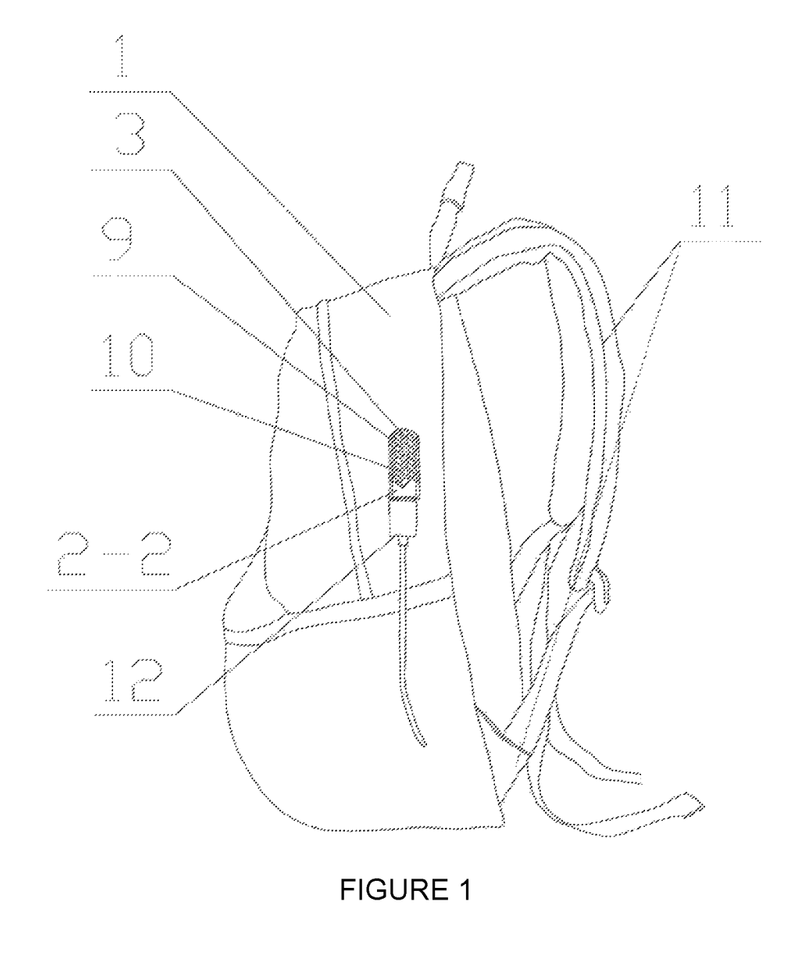
FIG. 1 is a structural schematic diagram of embodiment 1 of the utility model.

FIG. 1 shows embodiment 1 of the utility model, which is a backpack comprising the bag body 1, wherein, a placing space for placing an electrical storage device (which is not shown in the drawing) is provided inside the bag body 1, and a power cable outlet on the side of the bag body 1; the bag further comprises a USB extension cable 2 on the bag body 1, and the male connector 2-1 of the USB extension cable 2 is connected to the power storage device in the power storage device placing space; the female connector 2-2 is exposed outside the power cable outlet, and the female connector 2-2 is equipped with a sheath 3 for water proofing wrapped on the outer surface of the female connector 2-2; the male connector 2-2 is further equipped with a Bluetooth anti-lost alarm 9, which is used to connect to the Bluetooth device on the product to be charged, and a GPS device 10 for positioning.

During traveling, when the battery of the product to be charged is dying, it is only necessary to plug the external USB connecting line 12 to the female connector 2-2 of the USB extension cable 2, then the charging starts, without necessarily opening the bag or luggage, nor taking out the power source for charging.

Figure 2:
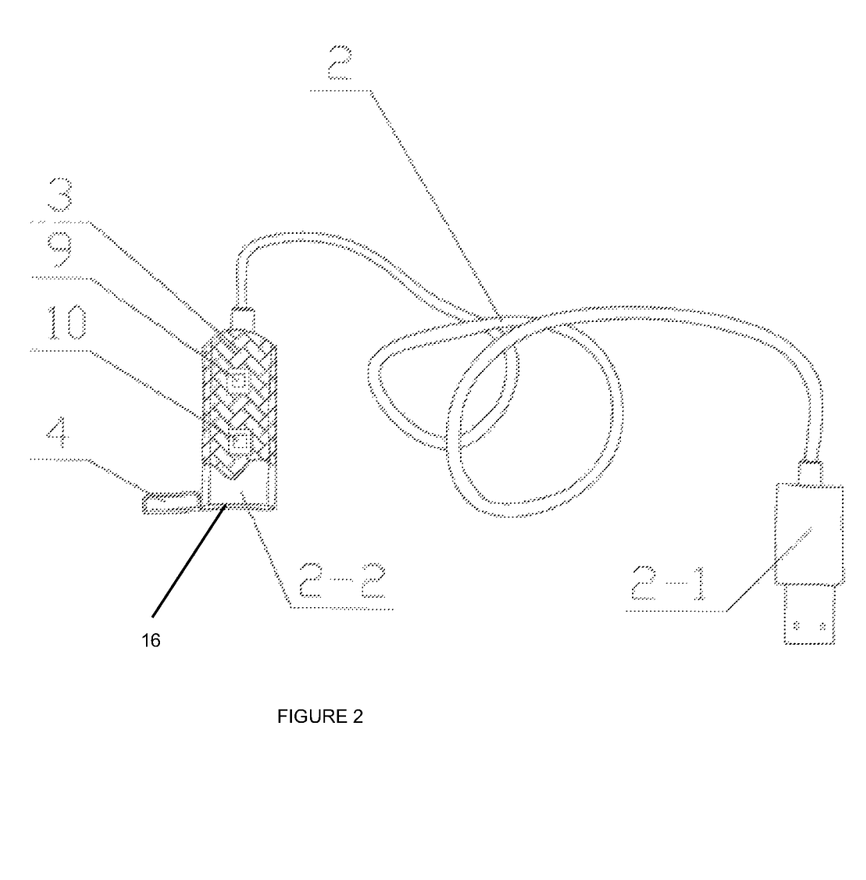
FIG. 2 is a structural schematic diagram of the USB extension cable of embodiment 2 of the utility model.

FIG. 2 shows embodiment 2 of the utility model, which is different to the embodiment 1 that the sheath 3 is further equipped with a dust cap 4 for dust proofing, and the dust cap 4 is attached on the operative end (16) of the female connector 2-2, which is overturning connected to the side of the female connector 2-2. As can be seen the shealth does not cover the operative end of the female connector, but the removable dust cap 4 does. The term operative end (16) refers to the end of the female connector that receives the male connector.

Figure 3:
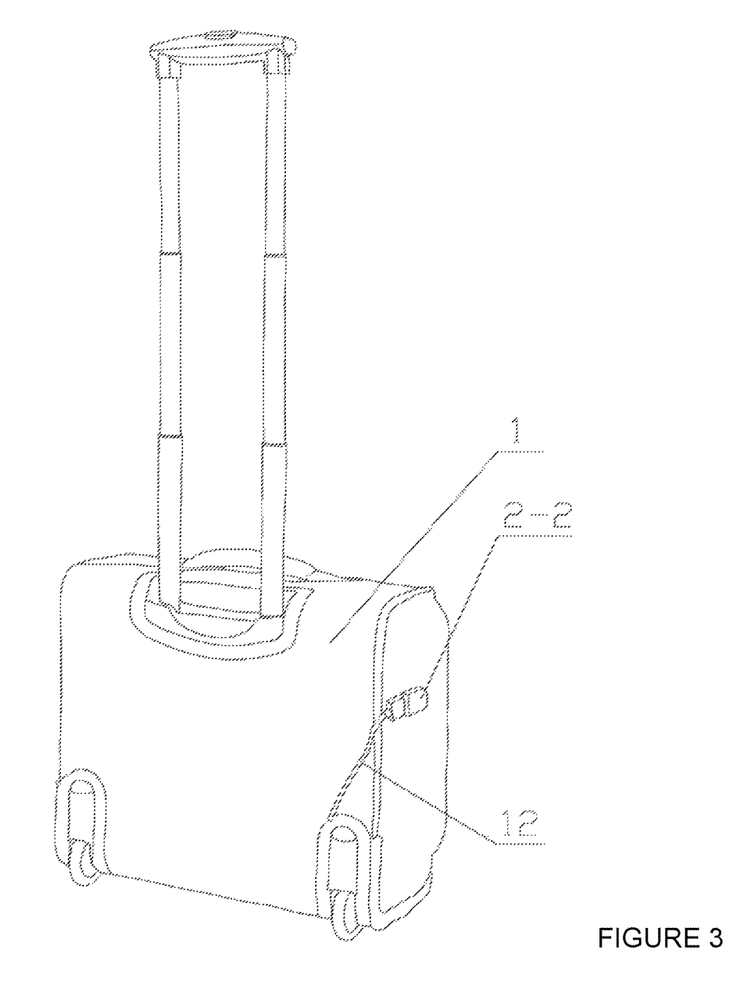
FIG. 3 is a structural schematic diagram of embodiment 3 of the utility model.

FIG. 3 shows embodiment 3 of the utility model, which is a rod box comprising the box body 1, wherein, a placing space for placing an electrical storage device (which is not shown in the drawing) is provided inside the box body 1, and a power cable outlet on the side of the box body 1; the box further comprises a USB extension cable 2 on the box body 1, and the male connector 2-1 of the USB extension cable 2 is connected to the power storage device in the power storage device placing space; the female connector 2-2 is exposed outside the power cable outlet, and the female connector 2-2 is equipped with a sheath 3 for water proofing wrapped on the outer surface of the female connector 2-2, and the external USB connecting line 12 connected to the female connector 2-2.

Figure 4:
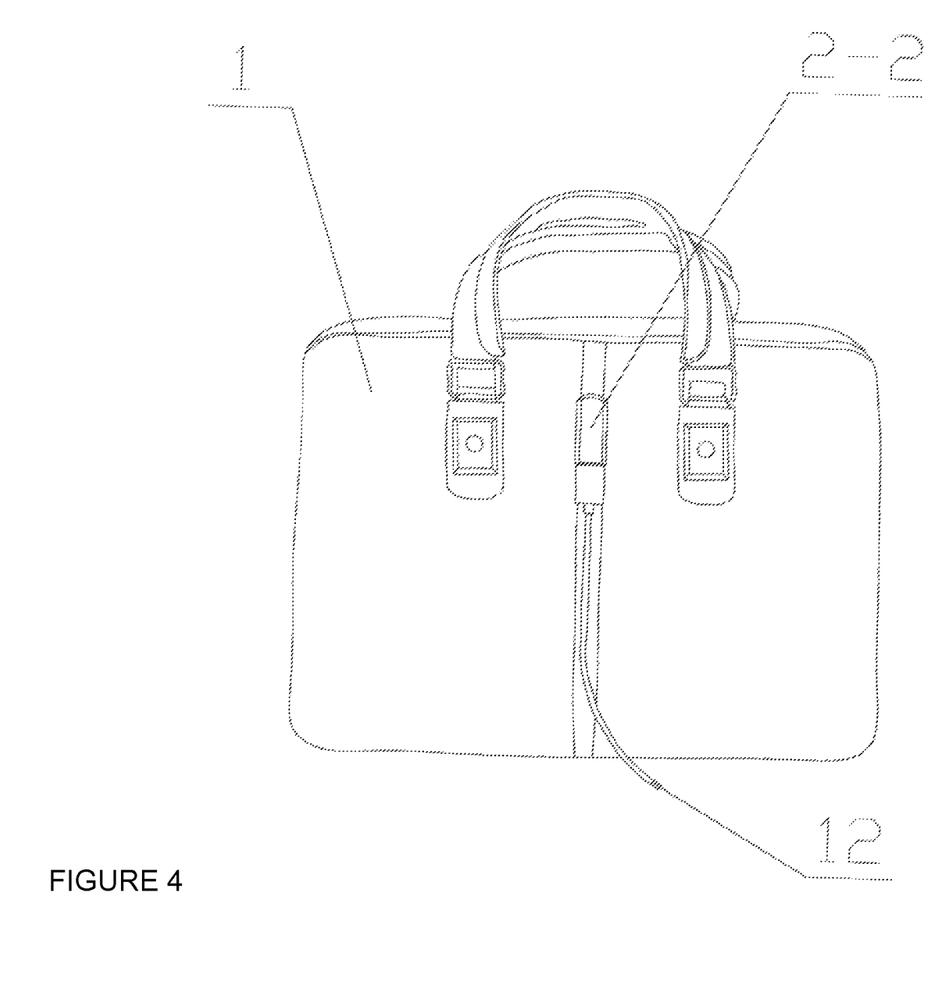
FIG. 4 is a structural schematic diagram of embodiment 4 of the utility model.

FIG. 4 shows embodiment 4 of the utility model, which is a gentlemen handbag comprising the bag body 1, wherein a placing space for placing an electrical storage device (which is not shown in the drawing) is provided inside the bag body 1, and a power cable outlet (which is not shown in the drawing) on the surface of the bag body 1; the bag further comprises a USB extension cable 2 on the bag body 1, and the male connector 2-1 of the USB extension cable 2 is connected to the power storage device in the power storage device placing space; the female connector 2-2 is exposed outside the power cable outlet, and the female connector 2-2 is equipped with a sheath 3 for water proofing wrapped on the outer surface of the female connector 2-2.

Figure 5:
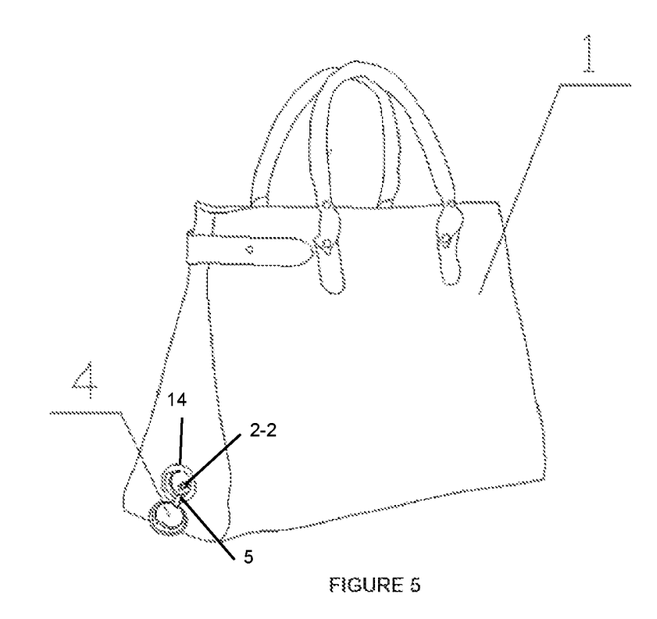
FIG. 5 is a structural schematic diagram of embodiment 5 of the utility model.

FIG. 5 shows embodiment 5 of the utility model, which is a lady handbag comprising the bag body 1, wherein, a placing space for placing an electrical storage device (which is not shown in the drawing) is provided inside the bag body 1, and a power cable outlet at the bottom on the side of the bag body 1; the bag further comprises a USB extension cable 2 on the bag body 1, and the male connector 2-1 of the USB extension cable 2 is connected to the power storage device in the power storage device placing space; the female connector 2-2 is at the power cable outlet 14, and the dust cap 4 is at the opening of the groove 5, which is overturning connected to the groove 5.

Figure 6:
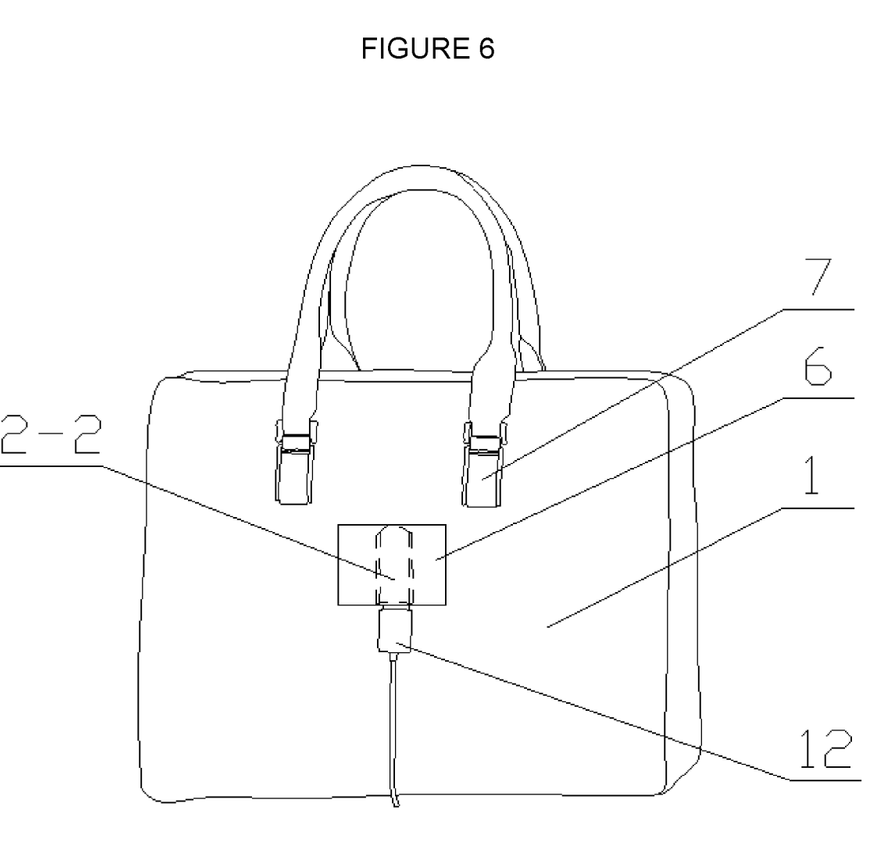
FIG. 6 is a structural schematic diagram of embodiment 6 of the utility model.

FIG. 6 shows embodiment 6 of the utility model, which is a briefcase comprising the case body 1, wherein, a placing space for placing an electrical storage device (which is not shown in the drawing) is provided inside the case body 1, and a power cable outlet at the bottom on the side of the case body 1; the case further comprises a USB extension cable 2 on the case body 1, and the male connector 2-1 of the USB extension cable 2 is connected to the power storage device in the power storage device placing space; the power cable outlet is below the nameplate 6, and the female connector 2-2 is at the power cable outlet.

Figure 7:
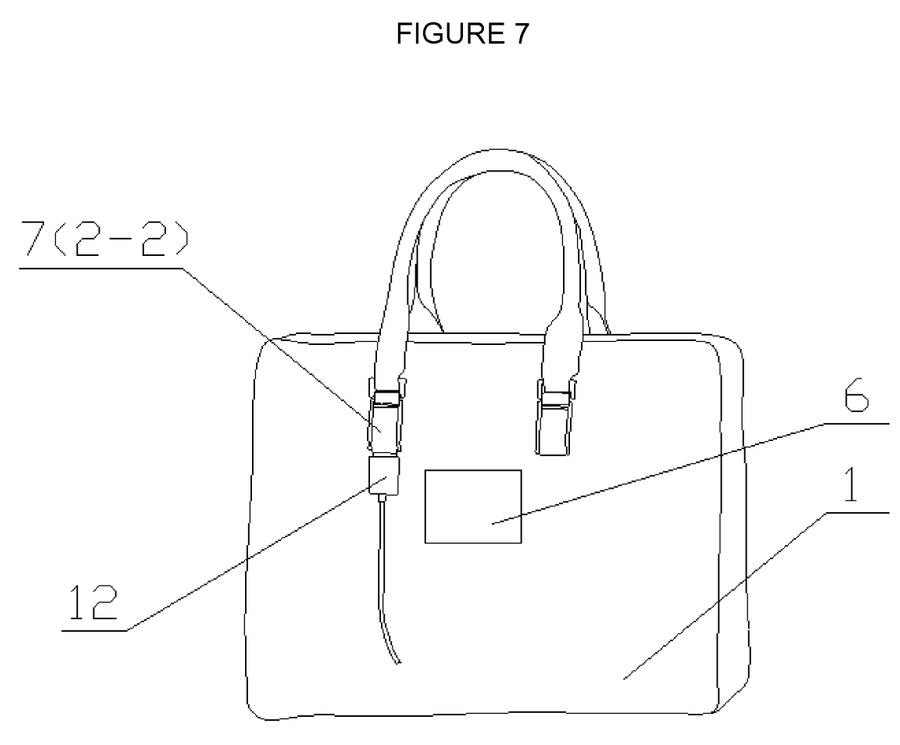
FIG. 7 is a structural schematic diagram of embodiment 7 of the utility model.

FIG. 7 shows embodiment 7 of the utility model, which is a briefcase. The difference between this embodiment and the embodiment 6 is that: the power cable outlet is below the fastener 7, and the female connector 2-2 is in the power cable outlet.

Figure 8:
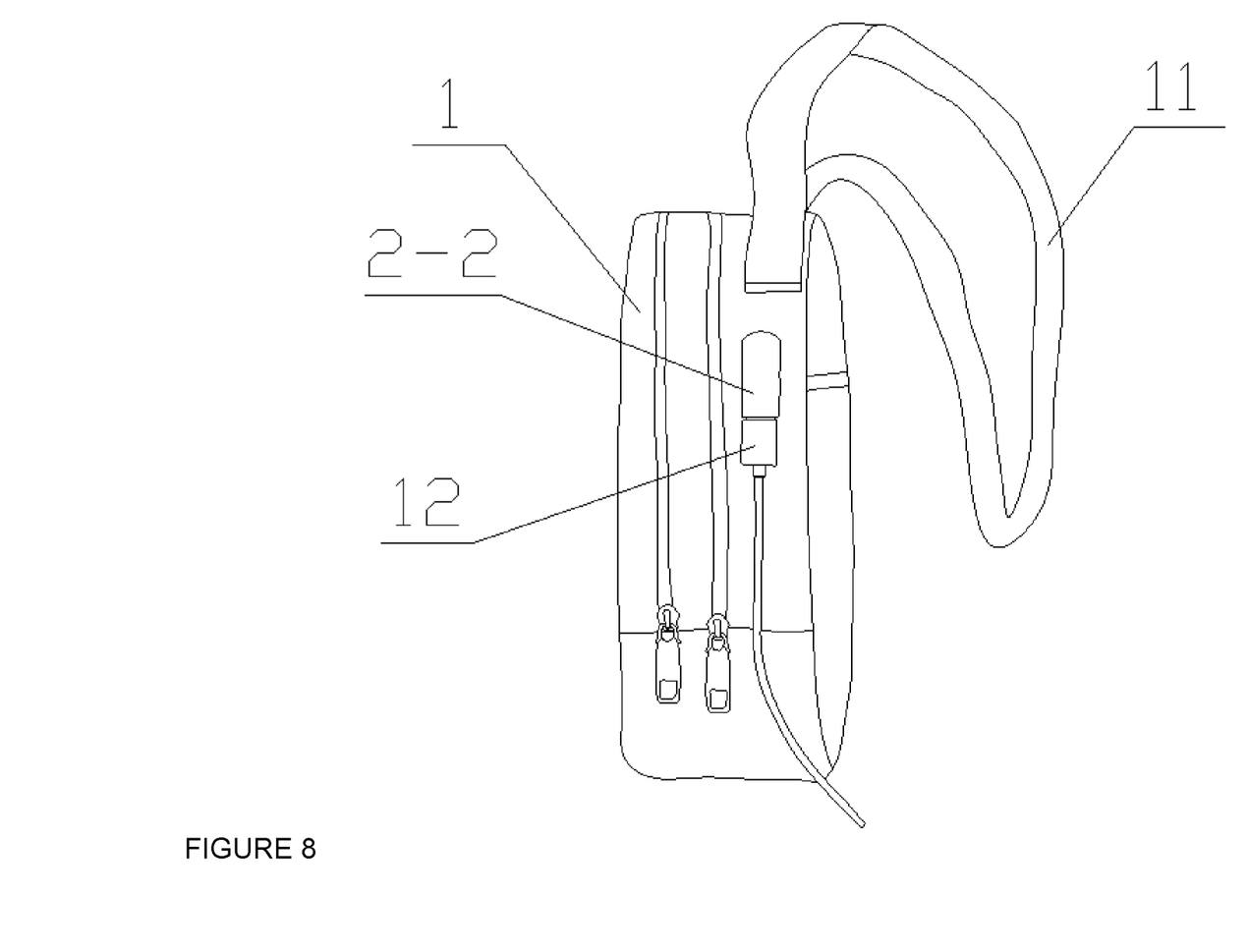
FIG. 8 is a structural schematic diagram of embodiment 8 of the utility model.

FIG. 8 shows embodiment 8 of the utility model, which is a shoulder bag comprising the bag body 1, wherein, a placing space for placing an electrical storage device (which is not shown in the drawing) is provided inside the bag body 1, and a power cable outlet on the side of the bag body 1; the bag further comprises a USB extension cable 2 on the bag body 1, and the male connector 2-1 of the USB extension cable 2 is connected to the power storage device in the power storage device placing space; the female connector 2-2 is exposed outside the power cable outlet, and the female connector 2-2 is equipped with a sheath 3 for water proofing wrapped on the outer surface of the female connector 2-2.

Figure 9:
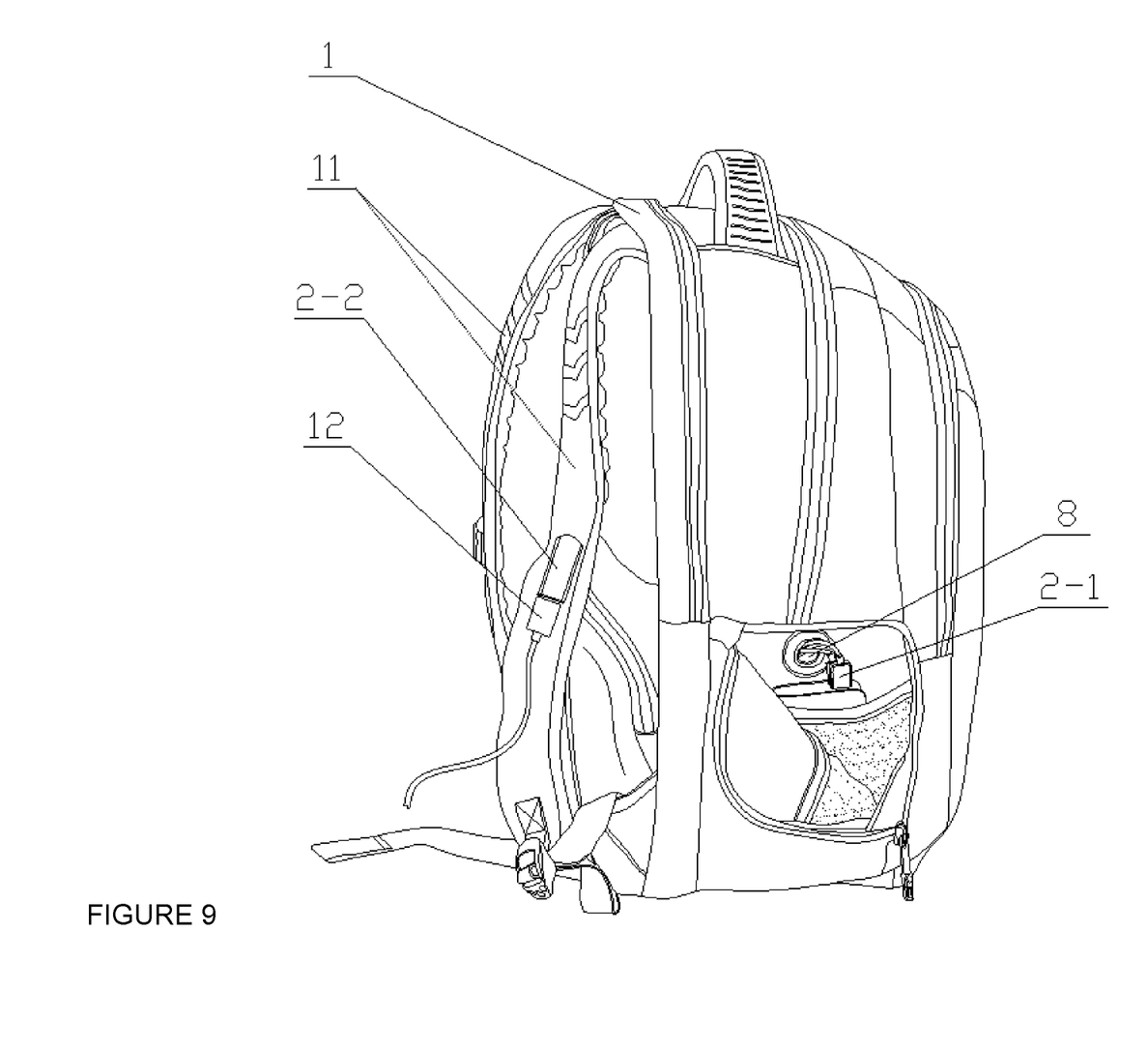
FIG. 9 is a structural schematic diagram of embodiment 9 of the utility model.

FIG. 9 shows embodiment 9 of the utility model, which is an outdoor backpack comprising the bag body 1, wherein, a placing space for placing an electrical storage device is provided inside the bag body 1, and a power cable outlet on a shoulder strap of the bag body 1; the bag further comprises a USB extension cable 2 on the bag body 1, and the male connector 2-1 of the USB extension cable 2 is connected to the power storage device in the power storage device placing space; the female connector 2-2 is exposed outside the power cable outlet, and the female connector 2-2 is equipped with a sheath 3 for water proofing wrapped on the outer surface of the female connector 2-2; the bag or luggage body 1 is provided with a cable laying channel 8 from the power storage device placing space to the power cable outlet for the penetration of the USB extension cable 2.

Figure 10:
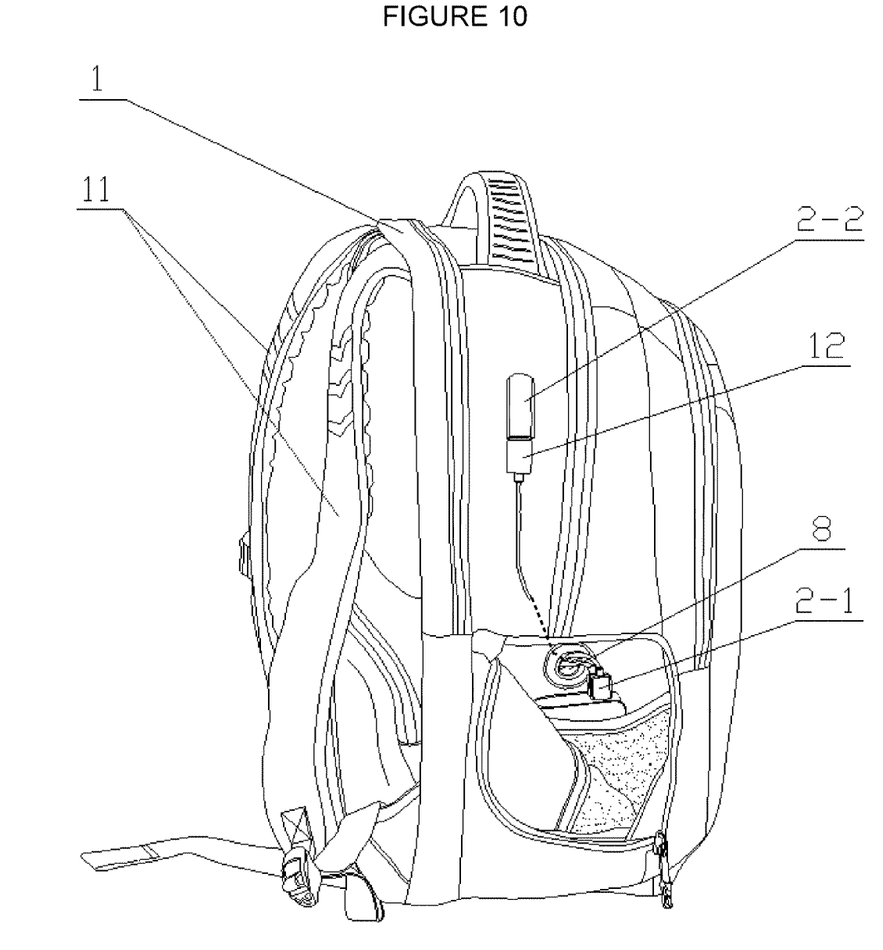
FIG. 10 is a structural schematic diagram of embodiment 10 of the utility model.

FIG. 10 shows the embodiment 10 of the utility model, which is an outdoor backpack. The difference between this embodiment and the embodiment 9 is that: the power cable outlet is on the side of the bag body 1.

With reference to the claims, the present invention provides a bag or luggage for convenient charging, comprising: a luggage body (1) having a placing space for placing a power storage device inside the luggage body and a power cable outlet on the outer surface of the luggage body (1); a USB extension cable (2) having a male connector (2-1) and a female connector (2-2) on the luggage body (1),wherein the male connector (2-1) of the USB extension cable is inside the luggage body (1) and is used to connect to the power storage device in the placing space; wherein the female connector (2-2) is in the power cable outlet or exposed outside the power cable outlet, and the female connector (2-2) is equipped with a sheath (3) wrapped on the outer surface of the female connector (2-2) for water proofing. The term "luggage body" includes any bag, bag body, purse, backpack, luggage or the like. The placing space would typically be a pocket on the inside of the luggage body that holds the power storage device. The power storage device may be any device capable of charging a device. The sheath (3) may be further equipped with a dust cap (4) for dust proofing. The power cable outlet is provided on the surface of the luggage body, the female connector (2-2) is exposed outside the power cable outlet, and the dust cap (4) is attached on the side of the female connector (2-2). The power cable outlet may be provided in a groove (5) on the side of the luggage body, the female connector is in the power cable outlet, and the dust cap is at the opening of the groove and connected to the groove. The power cable outlet may be provided on any edge of a nameplate (6). The power cable outlet is provided on either side of a fastener (7).The luggage body may be provided with a cable laying channel (8) from the power storage device placing space to the power cable outlet for the penetration of the USB extension cable (2). The male connector of the USB extension cable is further equipped with a wireless technology standard for exchanging data over short distances (e.g. Bluetooth™) as an anti-loss alarm (9), which is used to connect to the device on the product to be charged. The Bluetooth™ on the USB extension cable would connect with the Bluetooth™ on, for example, a phone and could be used to locate the luggage body. The male connector of the USB extension cable may be further equipped with a GPS device (10) for positioning. The term positioning may be interchanged with locating. The power cable outlet may be on a shoulder strap (11) of the bag.

The specific embodiments above are only detailed explanation on the technical solutions of the utility model, and the utility model is not limited only by the embodiments above. Any improvement or replacement based on the principle of the utility model shall be within the protection scope defined in claims of the utility model.

I claim:

1. A bag or luggage for convenient charging, comprising:
a bag or luggage body having a placing space for placing a power storage device inside the bag or luggage body and a power cable outlet on the outer surface of the bag or luggage body;
a USB extension cable having a male connector and a female connector having four sides and an operative end,
wherein the male connector of the USB extension cable is inside the bag or luggage body and is used to connect to the power storage device in the placing space;
wherein the female connector is retained outside and adjacent to the power cable outlet with one side of the four sides of the female connector in communication with the bag or luggage body, and the other three sides of the female connector are covered by a water proof sheath that protects the female connector and provides it in a flat position and wherein the sheath is above and covers the power cable outlet,
wherein the sheath does not cover the operative end of the female connector which is exposed and fixedly attached above the exterior of the bag such that the operative end of the female connector does not need to be moved and the bag or luggage body does not need to be opened to accept a charging interface of a product to be charged.

2. The bag or luggage for convenient charging according to claim 1, wherein the sheath is further equipped with a dust cap for dust proofing and the dust cap is movable to cover and uncover the operative end of the female connector.

3. The bag or luggage for convenient charging according to claim 2, wherein the power cable outlet is provided on the surface of the bag or luggage body, the female connector is exposed outside the power cable outlet, and the dust cap is attached on the side of the female connector.

4. The bag or luggage for convenient charging according to claim 1, wherein the power cable outlet is provided on any edge of a nameplate.

5. The bag or luggage for convenient charging according to claim 1, wherein the power cable outlet is provided on either side of a fastener.

6. The bag or luggage for convenient charging according to claim 1, wherein the bag or luggage body is provided with a cable laying channel from the power storage device placing space to the power cable outlet for the penetration of the USB extension cable.

7. The bag or luggage for convenient charging according to claim 1, wherein at least one of the male connector and the female connector of the USB extension cable is further equipped with a wireless technology standard for exchanging data over short distances as an anti-loss alarm, which is used to connect to the device on the product to be charged.

8. The bag or luggage for convenient charging according to claims 1, wherein at least one of the male connector and the female connector of the USB extension cable is further equipped with a GPS device for positioning.

9. The bag or luggage for convenient charging according to claim 1, wherein the power cable outlet is on a shoulder strap of the bag or a side panel or a front part of the bag or luggage.

10. A bag or luggage for convenient charging, comprising:
a bag or luggage body having a placing space for placing a power storage device inside the bag or luggage body and a power cable outlet on the outer surface of the bag or luggage body and a cable laying channel from the placing space to the power cable outlet for the penetration of a USB extension cable having a male connector and a female connector on the bag or luggage body having four sides and an operative end;
wherein the male connector of the USB extension cable is inside the bag or luggage body and is used to connect to the power storage device in the placing space;
wherein the female connector is retained outside and adjacent to the power cable outlet with one side of the four sides of the female connector in communication with the bag or luggage body, and the other three sides of the female connector are covered by a waterproof sheath that protects the female connector and provides it in a flat position, wherein the sheath is above and covers the power cable outlet, wherein the sheath does not cover the operative end of the female connector which is exposed and fixedly attached above the exterior of the bag such that the operative end of the female connector does not need to be moved and the bag or luggage body does not need to be opened to accept a charging interface of a product to be charged.

11. The bag or luggage for convenient charging according to claim 10, wherein the sheath is further equipped with a dust cap for dust proofing and the dust cap is movable to cover and uncover the operative end of the female connector.

12. The bag or luggage for convenient charging according to claim 10, wherein the power cable outlet is provided on the surface of the bag or luggage body, the female connector is exposed outside the power cable outlet, and a dust cap is attached on the side of the female connector.

13. The bag or luggage for convenient charging according to claim 10, wherein, the power cable outlet is provided on any edge of a nameplate.

14. The bag or luggage for convenient charging according to claim 10, wherein the power cable outlet is provided on either side of a fastener.

15. The bag or luggage for convenient charging according to claim 10, wherein at least one of the male connector and the female connector of the USB extension cable is further equipped with a wireless technology standard for exchanging data over short distances as an anti-loss alarm, which is used to connect to the device on the product to be charged.

16. The bag or luggage for convenient charging according to claim 10, wherein at least one of the male connector and the female connector of the USB extension cable is further equipped with a GPS device for positioning.

17. The bag or luggage for convenient charging according to claim 10, wherein the power cable outlet is on a shoulder strap of the bag.

* * * * *